US008887651B2

(12) United States Patent
Van Wesenbeeck et al.

(10) Patent No.: US 8,887,651 B2
(45) Date of Patent: Nov. 18, 2014

(54) AGRICULTURAL FUMIGATION USING A MULTILAYER FILM INCLUDING A PVDC VAPOR BARRIER

(75) Inventors: Ian Van Wesenbeeck, Fishers, IN (US); Charles A. Carn, Midland, MI (US); John D. Busacca, Noblesville, IN (US); Phillip J. Howard, Zionsville, IN (US); Dennis Lane, Zionsville, IN (US); Michael D. White, Midland, MI (US); Anthony Weiss, Brandon, FL (US)

(73) Assignee: Dow AgroSciences, LLC., Indianapolis, IN (US)

( * ) Notice: Subject to any disclaimer, the term of this patent is extended or adjusted under 35 U.S.C. 154(b) by 98 days.

(21) Appl. No.: 13/641,073

(22) PCT Filed: Apr. 14, 2011

(86) PCT No.: PCT/US2011/032477
§ 371 (c)(1),
(2), (4) Date: Oct. 12, 2012

(87) PCT Pub. No.: WO2011/130504
PCT Pub. Date: Oct. 20, 2011

(65) Prior Publication Data
US 2013/0032068 A1 Feb. 7, 2013

Related U.S. Application Data

(60) Provisional application No. 61/342,510, filed on Apr. 15, 2010.

(51) Int. Cl.
*A01C 23/00* (2006.01)
*A01G 13/00* (2006.01)
*A01M 13/00* (2006.01)
*A01M 17/00* (2006.01)
*A01G 9/14* (2006.01)

(52) U.S. Cl.
CPC ......... *A01M 17/002* (2013.01); *A01G 13/0275* (2013.01); *A01M 13/003* (2013.01); *A01G 9/1438* (2013.01)
USPC ........................................... 111/118

(58) Field of Classification Search
CPC ............ A01G 13/0275; A01G 9/1438; A01M 13/003; A01M 17/002
USPC ........... 111/118–129, 7.1–7.4, 200, 900, 906, 111/915, 919; 47/58.1 R, 58.1 SC; 422/28, 422/32; 504/117
See application file for complete search history.

(56) References Cited

U.S. PATENT DOCUMENTS

| 3,328,330 | A | 6/1967 | Trofimow et al. |
| 5,729,929 | A | 3/1998 | Burke |
| 6,908,592 | B1 | 6/2005 | Storkan et al. |
| 2007/0112068 | A1 | 5/2007 | Oohira et al. |
| 2007/0249501 | A1 | 10/2007 | Frim et al. |
| 2007/0298197 | A1 | 12/2007 | Bruyndonckx et al. |

OTHER PUBLICATIONS

International Search Report dated Jun. 20, 2011 as received in related application No. PCT/US2011/032477.
International Preliminary Report on Patentability dated Jul. 16, 2012 as received in related application No. PCT/US2011/032477.

*Primary Examiner* — Christopher J Novosad
(74) *Attorney, Agent, or Firm* — Carl D. Corvin; Maschoff Brennan

(57) ABSTRACT

Methods for fumigating soil include providing a fumigant including at least one volatile substance into or onto soil and applying over the soil a multilayer polymeric film to form a vapor barrier between the fumigant-treated soil and the atmosphere to at least partially contain the fumigant. The multilayer film includes at least one barrier layer comprising at least one vinylidene chloride polymer and protecting layers on each side of the barrier layer. The multilayer film preferably has at least one UV protecting layer and optionally at least one reflective layer.

25 Claims, No Drawings

US 8,887,651 B2

AGRICULTURAL FUMIGATION USING A MULTILAYER FILM INCLUDING A PVDC VAPOR BARRIER

CROSS REFERENCE TO RELATED APPLICATION

The present application is a 35 U.S.C. §371 national stage application of International Application No. PCT/US2011/032477, filed Apr. 14, 2011, which claims the benefit of U.S. Provisional Patent Application 61/342,510, filed Apr. 15, 2010, both of which are incorporated herein by reference.

FIELD OF THE INVENTION

This invention is related to the field of agricultural fumigations.

BACKGROUND

In recent years, the increasing trend for healthier diets has increased demand for more fruits and vegetables, which continues the need to farm in fields that are infested with soil-borne plant pathogens, insects, weeds and/or parasites, such as nematodes. Soil fumigation is often the best or only economical method of reducing those pest populations sufficiently to produce high quality and high yielding crops. In a representative soil fumigation protocol, a fumigant that includes one or more volatile substances is provided in compressed gas cylinders and shank-injected into the soil, for example, about 6 to 18 inches deep using a positive pressure closed system (for example, pressurized with nitrogen gas). In other fumigation methods, the volatile substances are applied to the soil by surface spraying or dripping. The soil is then covered, for example by a plastic sheet, to reduce the loss of fumigants into the atmosphere, which would result in loss of fumigant efficacy. For example, a polyethylene sheet can be laid down over the soil immediately behind the shanks of the injection equipment or immediately behind the sprayer or drip application equipment. The polyethylene sheet, although not impermeable to gases, can reduce the dissipation rate of gases into the air, and thus reduce the depletion of the volatile fumigants by dissipation into the atmosphere. Application of the plastic sheet is also referred to as "mulching" or "tarping" the soil. One example of plastic sheeting that is commonly used for soil mulching is high density polyethylene (HDPE). The end goal is for the volatile substances in the soil to effectively reduce or eliminate the pathogens, insects, weeds, parasites or other pests.

One problem with the soil fumigation approach, however, is that some of the volatile substances in the fumigants escape into the atmosphere. Government regulations have been implemented that require a "buffer zone" of a predetermined size around an area undergoing a fumigation treatment (i.e., application site) when certain fumigants are used, to reduce risks. A buffer zone provides distance between the application site (i.e., edge of a field being treated) allowing airborne residues to disperse with less risk. The size of a given buffer zone is based on the following factors: (1) fumigant application rate; (2) field size; (3) application equipment and methods; (4) fumigant used; and (5) emission-control measures (e.g., tarps). Buffer zone distances are scenario-based using applicable site conditions. Practices that reduce emissions (for example, use of high-barrier tarps) can result in significantly reduced buffer distances and reductions in the amount of fumigant needed to successfully control soil-borne pests.

In view of the above and other factors, there is a need for new fumigation methods that reduce the amount of fumigant necessary to achieve a desired end result, reduce the amounts of volatile substances that pass into the atmosphere following a fumigation treatment or application of other volatile substances, and reduce the size of buffer zones around application sites. The present inventions address these needs.

SUMMARY

This invention involves an agricultural fumigation method using a multilayer polymeric film including at least one barrier layer comprising polyvinylidene chloride and at least two polymeric protecting layers. More particularly but not exclusively, the invention relates to the use of multilayer polymeric films to provide a covering over soil that operates as a vapor barrier to restrict passage of volatile substances introduced into or onto the soil, such as, for example, volatile soil fumigants or other volatile pesticides or volatile organic materials, from the soil into the atmosphere.

One embodiment of the present application is a unique technique for agricultural fumigation. Other embodiments include unique methods, compositions, systems, devices, and apparatus directed to retaining a volatile substance in or on soil by applying a multilayer polymeric film over the soil to operate as a vapor barrier.

In one aspect of the present application, a method for fumigating soil includes introducing a fumigant including at least one volatile substance into or onto soil and covering the soil with a multilayer polymeric film to at least partially contain the fumigant. The film comprises a PVDC barrier layer, a first protecting layer on a first side of the PVDC barrier layer and a second protecting layer on a second side of the PVDC barrier layer. The barrier layer comprises less than about 10% of the thickness of the multilayer polymeric film.

In another aspect of the application, there is provided a field management method for growing cash crops susceptible to interference by one or more of weeds, disease, insects or nematodes that includes: (1) preparing a planting bed of soil for growing a crop; (2) performing soil fumigation by introducing a volatile fumigant into the planting bed of soil, covering at least a portion of the planting bed of soil with a multilayer polymeric film, and waiting for a period of time, prior to planting or transplanting a cash crop, to kill or suppress growth of one or more of weeds, diseases, insects or nematodes by soil fumigation; and (3) planting or transplanting the cash crop after the period of time ends. The multilayer film comprises a PVDC barrier layer, a first protecting layer on a first side of the PVDC barrier layer and a second protecting layer on a second side of the PVDC barrier layer. The barrier layer comprises less than about 10% of the thickness of the multilayer polymeric film. The cash crop can be, for example, tomatoes, peppers, strawberries, cucumbers or melons.

This application also provides a method for maintaining volatile agricultural fumigants in contact with soil that includes: (1) treating soil with an effective amount of a fumigant; (2) covering the fumigant-treated soil with a multilayer film comprising a PVDC barrier layer, a first protecting layer on a first side of the PVDC barrier layer and a second protecting layer on a second side of the PVDC barrier layer, wherein the barrier layer comprises less than about 10% of the thickness of the multilayer polymeric film; and (3) permitting the fumigant to diffuse through the covered soil. In one manner of practicing the method, the treating comprises injecting the fumigant into the soil before covering the soil with the film.

A wide variety of alternative embodiments of the above methods are contemplated. For example, these methods can be performed using a fumigant including one or more of the following volatile substances: methyl bromide, chloropicrin, 1,3-dichloro-1-propene (cis), 1,3-dichloro-1-propene (trans), mixtures of cis and trans 1,3-dichloro-propene, methyl isothiocyanate, metham-sodium, methyl iodide, sulfuryl fluoride, dimethyl disulfide, metam potassium, dazomet, 1,1,1,-trifluoro-2,6-dinitro-N,N-dipropyl-p-toluidine and 2,4-dichlorophenoxyacetic acid. In one embodiment, the fumigant includes methyl bromide, and the methyl bromide is introduced into or onto the soil at an average rate of less than 400 pounds per treated acre more preferably less than 350, still more preferably less than 300 pounds per treated acre, most preferably less than 250 pounds per treated acre. In another embodiment, the fumigant includes chloropicrin, and the chloropicrin is introduced into or onto the soil at an average rate of less than 200 pounds per treated acre. In yet another embodiment, the fumigant includes methyl bromide and chloropicrin, and the fumigant is introduced into or onto the soil at an average rate of less than 400 pounds per treated acre. The soil fumigated as disclosed herein can be used to grow a variety of desirable plants, including, for example, tomato plants, pepper plants, potato plants, strawberry plants, plants of the cucumber family, trees, shrubs, flowers and/or turf grasses With regard to the multilayer film used in the methods, in one embodiment the barrier layer comprises at least one vinylidene chloride/methyl acrylate, and each of the first and second protecting layers comprises at least one low density polyethylene, ethylene octene polymer, ethylene vinyl acetate, substantially linear ethylene polymer, ethylene methyl acrylate or combination thereof. In another embodiment, at least one of the protecting layers is a UV protecting layer that further comprises at least one carbon black or hindered amine light stabilizer (HALS) or benzotriazoles or combination thereof. In yet another embodiment, at least one of the protecting layers is a reflective layer that further comprises titanium dioxide, a metallic pigment or combination thereof. Embodiments are also contemplated that include at least one tie layer comprising ethylene vinyl acetate (EVA) copolymers or ethylene methacrylate (EMA) copolymers or ethylene acrylic acid (EAA) copolymers or ethylene ethyl acrylate (EEA) copolymers or combinations thereof. As representative embodiments, the multilayer film can comprise layers represented by ACB, BCB, ATCB, ACTB, ATCTB, BTCB, BCTB, BTCTB or a combination thereof in the indicated sequence wherein A is at least one reflective layer, B is at least one UV protecting layer, C is at least one barrier layer, and T is at least one tie layer.

Further embodiments, forms, objects, features, advantages, aspects, and benefits shall become apparent from the following description and drawings.

DESCRIPTION OF REPRESENTATIVE EMBODIMENTS

For the purposes of promoting an understanding of the principles of the inventions, reference will now be made to specific embodiments and specific language will be used to describe the same. It will nevertheless be understood that no limitation of the scope of the inventions is thereby intended. Any alterations and further modifications in the described embodiments, and any further applications of the principles of the inventions as described herein are contemplated as would normally occur to one skilled in the art to which the application relates.

DEFINITIONS

As used herein the term "film" refers to a sheet, laminate, web or the like or combinations thereof, having length and breadth dimensions and having two major surfaces with a thickness there between. A film can be a monolayer film (having only one layer) or a multilayer film (having two or more layers). A film, in most instances, has a thickness of up to about 30-35 mils ($7.5\text{-}8\times10^{-4}$ m).

The term "multilayer film" means a film having two or more layers that are at least partially contiguous and preferably, but optionally, coextensive. A multilayer film is composed of more than one layer preferably composed of at least two different compositions, advantageously extending substantially the length and breadth dimensions of the film. Layers of a multilayer film are usually bonded together by one or more of the following methods: coextrusion, extrusion coating, vapor deposition coating, solvent coating, emulsion coating, or suspension coating.

The term "tie layer" or "adhesive layer" or "bonding layer" means an inner layer having a primary purpose of providing interlayer adhesion to directly adjacent or contiguous layers, for instance between the interlayer and a glass. The tie layer may also impart other characteristics to the multicomponent structure of which it is a part.

The term "barrier layer" as used herein designates a layer of a multilayer film having a lower permeance or transmission of one or more gaseous permeants (for instance, agricultural fumigants) than other layers of the multilayer film. A "barrier resin" or "barrier polymer" means a polymer or polymer composition suitable for use in forming a barrier layer. The barrier resin would not provide lower permeance or transmission to chemicals capable of solublizing it, although there would typically be very few of such chemical compounds.

"Skin layer" means an outer layer including an outside layer, thus any layer which is on an exterior surface of a film or other multicomponent structure. A surface layer advantageously provides wear resistance, protection of inner layers which may be more susceptible to deterioration and/or tearing or puncture, a desired degree of adhesion or resistance to adhesion to a material or object it is adapted to contact, or similar characteristics, generally different from those of inner layers.

As used herein "contiguous" or "directly adjacent," when referred to two layers, is intended to refer to two layers that are directly touching or adhered one to the other. In contrast, as used herein, the word "between", as applied to a film layer expressed as being between two other specified layers, includes both direct adherence of the subject layer to the two other layers it is between, as well as lack of direct adherence to either or both of the two other layers the subject layer is between, that is, one or more additional layers can be imposed between the subject layer and one or more of the layers the subject layer is between.

"Laminate" (noun) refers to a material made up of two or more layers of material bonded or adhered together, and includes a multilayer film, such as a coextruded film. A rigid laminate is a laminate having sufficient thickness or at least one sufficiently rigid layer to prevent draping and sustain its shape upon handling.

"Laminate" (verb) as used herein, refers to adhering or joining two or more surfaces together, for instance joining separately produced films together to form a multilayer film.

There are many methods of laminating within the skill in the art, for instance by use of heat, wave radiation, adhesives, pressure, and the like.

"Extrusion," and "extrude," refer to the process of forming continuous shapes by forcing a molten plastic material through a die, followed by cooling or chemical hardening. Immediately prior to extrusion through the die, the relatively high-viscosity polymeric material is fed into a rotating screw, which forces it through the die.

"Coextrusion," and "coextrude," refer to the process of extruding two or more materials through a single die with two or more orifices arranged so that the extrudates merge and weld together into a laminar structure before cooling or chilling, that is, quenching. Coextrusion is often employed as an aspect of other processes, for instance, in film blowing, casting film, and extrusion coating processes.

"Blown film" or "film blowing" refers to a process for making a film in which a polymer or copolymer is extruded to form a bubble filled with heated air or another hot gas in order to stretch the polymer. Then, the bubble is collapsed and collected in flat film form.

The term "fumigant" means a chemical compound that is used in its gaseous state as a pesticide or disinfectant.

The term "soil fumigant" means a fumigant that is introduced onto or into soil for the purpose of controlling disease-causing fungi, nematodes, insects, weeds and/or other pests harbored in the soil.

The term "average rate" in the context of describing the rate at which a soil fumigant is applied to soil means the total amount of fumigant that is applied to the soil, typically measured in pounds, divided by the surface area of the soil treated, typically measured in acres.

The term "polyethylene" means a homopolymer of ethylene or an ethylene/alpha-olefin copolymer having a majority of its mer units derived from ethylene.

The term "ethylene/alpha-olefin copolymer" designates copolymers of ethylene with one or more comonomers selected from $C_3$ to $C_{20}$ alpha-olefins, such as 1-butene, 1-pentene, 1-hexene, 1-octene, methyl pentene and the like. Included are polymer molecules comprising long chains with relatively few side chain branches obtained by low pressure polymerization processes and the side branching that is present is short compared to non-linear polyethylenes (for instance, LDPE, a low density polyethylene homopolymer). Ethylene/alpha-olefin copolymers generally have a density in the range of from about 0.86 g/cm³ to about 0.94 g/cm³. The term linear low density polyethylene (LLDPE) is generally understood to include that group of ethylene/alpha-olefin copolymers which fall into the density range of about 0.915 to about 0.94 g/cm³ or 0.930 when linear polyethylene in the density range from about 0.926 to about 0.95 g/cm³ is referred to as linear medium density polyethylene (LMDPE). Lower density ethylene/alpha-olefin copolymers may be referred to as very low density polyethylene (VLDPE), often used to refer to the ethylene/butene copolymers commercially available from Union Carbide Corporation and ultra-low density polyethylene (ULDPE), typically used to refer to certain ethylene/octene copolymers supplied by the Dow Chemical Company, with a density ranging from about 0.88 to about 0.915 g/cm³. LLDPE is an abbreviation for linear low density polyethylene and refers to copolymers of ethylene having: (1) at least one higher-alpha-olefin such as butene, octene, hexene and the like as a comonomer; (2) a density of from about 0.915 to as high as about 0.930 grams per cubic centimeter; (3) molecules comprising long chains with few or no branches or cross-linked structures; and, (4) being produced at low to medium pressures by copolymerization using heterogeneous catalysts based on transition metal compounds of variable valance.

The phrase ethylene/alpha-olefin copolymer also includes homogeneous polymers such as metallocene-catalyzed EXACT™ linear homogeneous ethylene/alpha-olefin copolymer resins commercially available from the Exxon Chemical Company, of Baytown, Tex.; TAFMER™ linear homogeneous ethylene/alpha-olefin copolymer resins commercially available from the Mitsui Petrochemical Corporation; and long-chain branched, metallocene-catalyzed homogeneous ethylene/alpha-olefin copolymers commercially available from The Dow Chemical Company, for instance, known as AFFINITY™ or ENGAGE™ resins. The phrase "homogeneous polymer" refers to polymerization reaction products of relatively narrow molecular weight distribution and relatively narrow composition distribution. Homogeneous polymers are structurally different from heterogeneous polymers (for instance, ULDPE, VLDPE, LLDPE, and LMDPE) in that homogeneous polymers exhibit a relatively even sequencing of comonomers within a chain, a mirroring of sequence distribution in all chains, and a similarity of length of all chains, that is, a narrower molecular weight distribution. Furthermore, homogeneous polymers are most often prepared using metallocene, or other single-site type catalysts, rather than using Ziegler-Natta catalysts. Such single-site catalysts typically have only one type of catalytic site, which is believed to be the basis for the homogeneity of the polymers resulting from the polymerization.

The term "substantially linear" means that, in addition to the short chain branches attributable to homogeneous comonomer incorporation, the ethylene polymer is further characterized as having long chain branches in that the polymer backbone is substituted with an average of 0.01 to 3 long chain branches/1000 carbons. Preferred substantially linear polymers are substituted with from 0.01 long chain branch/ 1000 carbons to 1 long chain branch/1000 carbons, and more preferably from 0.05 long chain branch/1000 carbons to 1 long chain branch/1000 carbons.

The substantially linear ethylene/alpha-olefin polymers are made by a continuous process using suitable constrained geometry catalysts, preferably constrained geometry catalysts as disclosed in U.S. Pat. Nos. 5,132,380, 5,703,187; and 6,013,819. The monocyclopentadienyl transition metal olefin polymerization catalysts taught in U.S. Pat. No. 5,026,798 and are also suitable for use in preparing the polymers of the present invention.

Long chain branching is defined herein as a branch having a chain length greater than that of any short chain branches which are a result of comonomer incorporation. The long chain branch can be as long as about the same length as the length of the polymer backbone. Long chain branching can be determined using methods within the skill in the art, for instance by using 13C nuclear magnetic resonance (NMR) spectroscopy measurements, with quantification using, for instance, the method of Randall (Rev. Macromol. Chem. Phys., C29 (2&3), p. 275-287).

In substantially linear ethylene/alpha-olefin polymers, the $I_{10}/I_2$ ratio indicates the degree of long chain branching, that is, the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8 or above, and as high as about 25. The melt index of a substantially linear ethylene polymer is measured according to ASTM D-1238 condition 190° C./2.16 Kg (formerly known as Condition E).

The term "single site catalysts" is recognized in the art as referring to catalysts which have less diversity in the individual polymer chains produced than is observed in polymers made using Ziegler Natta catalysts. This diversity is evidenced in broader MWD. Single site catalysts include single site metallocene or single site constrained geometry catalyst; these are exemplified by U.S. Pat. No. 4,937,299 (Ewen et al.), U.S. Pat. No. 5,218,071 (Tsutsui et al.), U.S. Pat. Nos. 5,278,272, 5,324,800, 5,084,534, 5,405,922, 4,588,794, 5,204,419.

HDPE is an abbreviation for high density polyethylene and designates polyethylene having a density from about 0.950 to 0.965 g/cm$^3$. HDPE is frequently an ethylene homopolymer.

As used herein, the term "ethylene/vinyl acetate copolymer" or "EVA" designates a copolymer formed from ethylene and vinyl acetate monomers wherein the ethylene derived units are present in amounts of at least 50 percent by weight and the vinyl acetate derived units are present in amounts of less than 50 percent by weight. The vinyl acetate content may range from a low of 2 or 3 percent to a high of 40 or 50 percent depending upon the desired properties and is generally from 1 to 30 percent by weight, with 12 to 35 weight percent vinyl acetate often used for tie layer applications. In polymer blends, EVA is often added to improve bonding between polymer phases.

As used herein, the term "ethylene/methyl acrylate copolymer" or "EMA" designates a copolymer formed from ethylene and methyl acrylate monomers wherein the ethylene derived units are present in amounts of at least 50 percent by weight and the methyl acrylate derived units are present in amounts of less than 50 percent by weight. The methyl acrylate content may range from a low of 2 or 3 percent to a high of 40 or 50 percent depending upon the desired properties and is generally from 1 to 30 percent by weight, with 18 to 30 weight percent methyl acrylate often used for tie layer applications. In polymer blends, EMA is often added to improve bonding between polymer phases.

As used herein, the term "ethylene/acrylic acid copolymer" or "EAA" designates a copolymer formed from ethylene and acrylic acid monomers wherein the ethylene derived units are present in amounts of at least 50 percent by weight and the acrylic acid derived units are present in amounts of less than 50 percent by weight. The acrylic acid content may range from a low of 2 or 3 percent to a high of 40 or 50 percent depending upon the desired properties and is generally from 1 to 30 percent by weight, with 12 to 35 weight percent acrylic acid often used for tie layer applications. In polymer blends, EAA is often added to improve bonding between polymer phases.

As used herein, the term "ethylene/ethyl acrylate copolymer" or "EEA" designates a copolymer formed from ethylene and ethyl acrylate monomers wherein the ethylene derived units are present in amounts of at least 50 percent by weight and the ethyl acrylate derived units are present in amounts of less than 50 percent by weight. The ethyl acrylate content may range from a low of 2 or 3 percent to a high of 40 or 50 percent depending upon the desired properties and is generally from 1 to 30 percent by weight, with 18 to 30 weight percent ethyl acrylate often used for tie layer applications. In polymer blends, EEA is often added to improve bonding between polymer phases.

As used herein, the term "ethylene/vinyl alcohol copolymer" or "EVOH" designates a copolymer formed from ethylene and vinyl alcohol, prepared by for example, hydrolysis or saponification of vinyl acetate copolymers, or by chemical reactions with polyvinyl alcohol. The degree of hydrolysis is preferably at least 50 percent and more preferably at least 85 percent. The ethylene comonomer is generally present in a range of about 15 to about 65 weight percent.

All percentages, preferred amounts or measurements, ranges and endpoints thereof herein are inclusive, that is, "less than about 10" includes about 10. "At least" is, thus, equivalent to "greater than or equal to," and "at most" is, thus, equivalent "to less than or equal to." Numbers herein have no more precision than stated. Thus, "115" includes at least from 114.5 to 115.49. Furthermore, all lists are inclusive of any and all combinations of two or more members of the list and all ranges are inclusive of any and all subsets within the range having endpoints within the range as if each combination and subset were expressly stated herein. All ranges from a parameter described as "at least," "greater than," "greater than or equal to" or similarly, to a parameter described as "at most," "up to," "less than," "less than or equal to" or similarly are preferred ranges regardless of the relative degree of preference indicated for each parameter. Thus a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise. Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and can be set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter can be acceptable to achieve another desirable end.

The term "comprising", is synonymous with "including," "containing," or "characterized by," is inclusive or open-ended and does not exclude additional, unrecited elements, material, or steps.

The invention includes a multilayer film including at least one barrier layer between two protecting layers.

The barrier layer is a barrier to permeation of at least one soil fumigant and comprises at least one vinylidene chloride polymer. Vinylidene chloride polymers (also known as vinylidene chloride resins, interpolymers of vinylidene chloride, vinylidene chloride interpolymers, copolymers of vinylidene chloride, and PVDC) are well-known in the art. See, for example, U.S. Pat. Nos. 3,642,743 and 3,879,359. As used herein, the term "interpolymer of vinylidene chloride," "vinylidene chloride interpolymer" or "PVDC" encompasses copolymers, terpolymers, and higher polymers wherein the major component is vinylidene chloride, optionally and preferably having one or more mono-ethylenically unsaturated monomer (monounsaturated comonomer) copolymerizable with the vinylidene chloride monomer such as vinyl chloride, alkyl acrylates, alkyl methacrylates, acrylic acid, methacrylic acid, itaconic acid, acrylonitrile, and methacrylonitrile. In one embodiment this invention is particularly applicable to alkyl acrylate vinylidene chloride polymers (acrylate PVDC). The vinylidene chloride polymer has monomer units from vinylidene chloride and at least one alkyl acrylate. Such alkyl acrylates include alkyl acrylates having alkyl groups of from 1 to 5 carbon atoms and combinations thereof, preferably methyl acrylate, ethyl acrylate, or butyl acrylate, or combinations thereof, more preferably methyl or butyl acrylate, or combinations thereof, more preferably methyl acrylate or combinations therewith. In another embodiment, the vinylidene chloride polymer optionally also has at least one additional monounsaturated comonomer polymerizable with vinylidene chloride and an alkyl acrylate, such as vinyl chloride, alkyl methacrylates, acrylic acid, methacrylic acid, itaconic acid, acrylonitrile, methacrylonitrile, and combinations thereof, preferably alkyl methacrylates, acrylic acid, methacrylic acid, itaconic acid, acrylonitrile, methacrylonitrile, or combinations thereof.

The barrier layer or layers advantageously comprise at least about 80, preferably at least about 85, more preferably at least about 90, most preferably at least about 95 percent by weight of polyvinylidene chloride polymer or combination thereof. The remainder of each layer is optionally at least one polymer compatible with vinylidene chloride polymer, additives within the skill in the art such as, for example and without limitation, stabilizers, processing agents, antiblock agents, slip agents, and combinations thereof.

The barrier layer is preferably at least about 5, more preferably at least about 6, most preferably at least about 7, and independently preferably at most about 10, more preferably at most about 9, most preferably at most about 8 percent by volume of the multilayer film of the invention. In a preferred film where the layers are coextensive, relative volume substantially corresponds to relative thickness. In the more preferred multilayer film of the invention, the total film thickness is preferably at least about 0.5 mils (12.7 µm), more preferably at least about 0.75 mils (19.1 µm), most preferably at least about 1.0 mils (25.4 µm), and independently preferably at most about 2.0 mils (50.8 µm), more preferably at most about 1.75 mils (44.5 µm), most preferably at most about 1.5 mils (38.1 µm).

In the practice of the invention, barrier properties suitable for different applications are achievable by such means as modifying the volume or thickness of the PVDC layer or using different PVDC copolymers that have different barrier values. For example, one can use a thinner layer of a higher barrier PVDC material or a thicker layer of a lower barrier PVDC material to achieve a similar effect in terms of barrier functionality. In the practice of the invention, however, it is important that the thickness of the barrier does not exceed 10% of the total film thickness because a PVDC layer higher than 10% results in an undesirable loss of layability, toughness and long term stability features. More specifically, the crystallinity present in PVDC adversely affects its overall toughness, as measured by Elmendorf tear, dart impact, or puncture testing. In a coextruded film, once the PVDC layer percentage reaches the threshold value of 10%, it will begin to dominate the contribution of the other layers to the overall toughness of the film.

The first and second protecting layers operate to prevent damage to the barrier layer or to the multilayer film as a whole, such as, for example, by tearing, puncturing or other physical injury in the ordinary course of use as contemplated herein, or, as another example, degradation or deterioration, such as may result from the exposure to heat, UV light, broad spectrum solar radiation or other type of electromagnetic radiation. Each of the first and second protecting layers comprises at least one polymer. The polymer is suitably any polymer within the skill in the art for making multilayer films. Those skilled in the art recognize that the polymer is selected for its properties that are desirable in a particular end use. For agricultural mulch films, preferred polymers include low density polyethylene, ethylene-octene copolymers, ethylene-vinyl acetate copolymers, ethylene methyl acrylate copolymers or combinations thereof, with ethylene polymers or combinations thereof preferred. As in the case of the barrier layer, each protecting layer optionally includes additives within the skill in the art such as, for example and without limitation, stabilizers, processing agents, antiblock agents, slip agents, and combinations thereof.

One or more tie layers are optionally used between any layers of the multilayer film of the invention, particularly any layers that have less than the desired adhesion to each other without the tie layer. Tie layers are within the skill in the art. Their composition is determined by that of the immediately adjacent layers such that the tie layer adheres to each immediately adjacent layer. Polymers comprising ethylene/vinyl acetate copolymer (EVA), ethylene/methyl acrylate (EMA), ethylene/acrylic acid (EAA), or ethylene/ethyl acrylate (EEA) are often used in tie layers adjacent polyvinylidene chloride.

In one embodiment, at least one of the first and second protecting layers is a UV protecting layer. The UV protecting layer preferably includes at least one layer comprising at least one dark pigment, that is a pigment capable of absorbing ultra violet (UV) light, that is, light having a wave length between about 200 and 400 nm, or other UV absorbent. Pigments capable of absorbing UV light are within the skill in the art and include, for instance, carbon black. A layer comprising such a dark pigment is referred to herein as a dark layer and, because it operates by absorbing or blocking UV light, thereby shielding the polymer from UV light it is also referred to as a UV barrier layer. As an alternative to or in addition to a pigment, the UV protecting layer can include a chemical absorbent. Pigment has the advantage of continuing to absorb UV light after initial exposure whereas some chemical absorbents undergo chemical changes as a result of absorption. Such absorbents may also affect the surrounding polymer. The amount of pigment or absorbent used is preferably sufficient to absorb sufficient UV light to protect the multilayer film from deterioration caused by UV light during use. Those skilled in the art will recognize that this amount will vary with such factors as the pigment or absorbent, the length of time the mulch film is to be left on the soil, the amount of sunlight exposure and the like, but can be determined without undue experimentation. In general an amount of dark pigment sufficient to result in a L* (transmittance) value as determined by the procedures of ASTM E308-06 of the combination of layers with UV absorbing material of preferably at most about 2, more preferably at most about 1.5, most preferably at most about 1.0 is sufficient to absorb UV light to which a mulch film will be exposed. This L* is suitably provided, for instance by a loading of preferably at most about 2, more preferably at most about 4, most preferably at most about 6 percent by weight carbon black in one or more layers that together make up about 50 percent of the volume of a multilayer film.

In another embodiment, the UV protecting layer includes other UV protecting additives such as, for example, HALS (hindered amine light stabilizers) or benzotriazoles. In contrast to UV absorbers, HALS and benzotriazoles operate by scavenging the radical intermediates formed in the photooxidation process, thereby inhibiting degradation of the polymer. Both classes of stabilizers are known to exhibit high efficiency and longevity due to a cyclic process wherein they are regenerated rather than consumed during the stabilization process. They also protect polymers from thermal degradation and can be used as thermal stabilizers.

In another embodiment, the multilayer film optionally includes more than one UV protecting layers, preferably dark layers. In one embodiment, both of the protecting layers of the multilayer film are UV protecting layers as described above. In yet another embodiment, one or more UV protecting layers are included separate from the first and second protecting layers, which may themselves also be UV protecting layers. For example, in a multilayer film with greater than 5 layers, it is generally not feasible to have a single thick layer to accomplish this UV protecting task. Doing so would require the operator to reduce extrusion rates of several extruders to allow one extruder to increase the overall thickness of one layer of the film. Instead, it is better to add pigment or other UV blocker to several layers, and run all of the extruders at a high rate. This allows an operator to build sufficient thickness of pigmented layers without having to take a rate penalty in the manufacturing process. The number of layers is preferably that number adequate to provide the preferred UV absorbance with a convenient loading of the selected UV absorbent or combination thereof. In most instances, however, adequate UV absorbance is attainable with one layer containing a pigment such as carbon black.

The combined thickness of such UV protecting layers is preferably at least about 0.5 mil (12.7 µm), more preferably at least about 0.75 mils (19.1 µm), most preferably at least about 1.0 mil (25.4 µm), and independently preferably at most about 2.0 mils (50.8 µm), more preferably at most about 1.75 mils (44.5 µm), most preferably at most about 1.5 mil (38.1 µm). In a preferred multilayer film such layer or layers comprise preferably at least about 25, more preferably at least about 50, most preferably at least about 75, and independently preferably at most about 96, more preferably at most about 94, most preferably at most about 92 volume percent of the film.

In addition to or as an alternative to the above, in another embodiment at least one of the first and second protecting layers is a reflective layer effective to provide additional UV protection and/or some thermal protection to the multilayer film. A reflective layer is a layer that reflects visible and, preferably, also UV light. It is perceived as white or light colored, for instance silver or other metallic colored. Such layers provide protection from light, and preferably also some protection from thermal radiation, that is, heat. Reflective layers are within the skill in the art and often contain silver, aluminum, or other metallic pigment or coating or have a white pigment such as titanium dioxide or combinations thereof. In the practice of the invention, the reflective layer is preferably sufficiently reflective to accomplish those of the following purposes appropriate for a preselected end use: protection from light, protection from heat, aesthetic appeal, printability, or a combination thereof. In most instances, an amount of reflective or white pigment sufficient to result in a L* (reflectance) value as determined by the procedures of ASTM E308-06 of preferably at least about 75, more preferably at least about 80, most preferably at least about 85 is sufficient to provide the desired qualities. This L* is suitably provided, for instance by a loading of preferably at least about 2, more preferably at least about 4, most preferably at least about 6, and independently preferably at most about 20, more preferably at most about 15, most preferably at most about 10 percent by weight of titanium dioxide based on weight of polymer in the light layer or layers.

For the same reasons explained for the UV protecting layer, multiple reflective layers are often preferable. Thus, in another embodiment, the multilayer film optionally includes more than one reflective layers. In one embodiment, both of the protecting layers of the multilayer film are reflective layers as described above. In yet another embodiment, one or more reflective layers are included separate from the first and second protecting layers, which themselves may also be reflective layers. The thickness of the reflective layer or layers combined, if present, is preferably at least about 0.25 mil (6.4 µm), more preferably at least about 0.25 mils (6.4 µm), most preferably at least about 0.5 mils (12.7 µm), and independently preferably at most about 1.25 mils (31.8 µm), more preferably at most about 1.0 mils (25.4 µm), most preferably at most about 0.75 mils (19.0 µm). In a preferred multilayer film, such layers comprise preferably at least about 17, more preferably at least about 33, most preferably at least about 50, and independently preferably at most about 67, more preferably at most about 75, most preferably at most about 83 volume percent of the film. When the reflective layer also reflects at least about 95 percent of UV light to which the film is exposed, a UV protecting layer is unnecessary, or stated otherwise, the reflective layer is also the UV protecting layer. Other reflective layers that reflect UV light, but to a reduced extent reduce the need for the amount of UV absorbing or blocking additive or thickness of UV protecting layer or layers. Those skilled in the art can measure the penetration or reflection of UV light to determine the amount to be absorbed by the UV protecting layers.

In addition to the reflective pigment or other additives, each reflective layer, like each UV protecting layer, comprises at least one polymer. The polymer is suitably any polymer within the skill in the art for making multilayer films. Those skilled in the art recognize that the polymer is selected for its properties that are desirable in a particular end use. For agricultural mulch films, preferred polymers, especially for the outer layer, include linear low density polyethylene (LLDPE), ethylene-octene copolymers, substantially linear ethylene polymers, low density polyethylene, tough polymers such as nylon or polypropylene or combinations thereof, with the ethylene polymers or combinations thereof preferred, and LLDPE or combinations thereof, especially with other ethylene polymers most preferred. In a preferred embodiment when more than one layer of a multilayer film of the invention is reflective, it is preferred that these layers serve other purposes as well. That is, rather than adding layers only for the purpose of introducing or increasing reflection of light or heat, it is preferred to use white or light pigment in layers otherwise present such as tie layers. For that reason the additional reflective layers preferably comprise polymers useful for purposes such as ethylene vinyl acetate (EVA), ethylene/methyl acrylate (EMA) or substantially linear ethylene polymers for tie layers, most preferably EVA. As in the case of the barrier layer, each reflective layer optionally contains additives within the skill in the art such as, for example and without limitation, stabilizers, processing agents, antiblock agents, slip agents, and combinations thereof. In addition, each reflective layer optionally includes a UV protecting ingredient, such as a pigment or HALS or benzophenone as discussed above.

Those skilled in the art will recognize that one or more other layers within the skill in the art, for instance a strengthening layer, bulk layer, stiffening layer or the like or combination thereof are optionally included in a multilayer films of the invention. In addition, optionally low density polyethylene (LDPE) is blended into one or more layers to allow for easier extrusion by increasing shear thinning and to provide melt strength during film bubble formation.

An agricultural fumigation mulch film as described herein can also serve a second purpose in addition to providing a barrier to volatile substances used as fumigants. For example, agricultural mulch films can also operate either to increase the temperature of the underlying soil (in the case of a light absorbing film) or to prevent the increase in temperature of the underlying soil that would otherwise occur in the absence of the film (in the case of a light reflecting film). In one embodiment, the present application provides a versatile film that can be used in either of the above-described conditions. In this embodiment, a multilayer film includes a barrier layer, at least one light absorbing layer on a first side of the barrier layer and at least one reflecting layer on a second side of the barrier layer. The light absorbing layer can be composed as described above in connection with the UV protecting layer.

A versatile film as described above can be placed over soil in an orientation whereby the reflecting layer faces away from the soil relative to the barrier layer. In this orientation, which may desirably be used in summer months when the prevailing weather conditions include relatively high temperatures and sunshine, the reflecting layer faces toward the sun and reflects light and heat to reduce the degree to which solar radiation increases the temperature of the soil. In another use, this versatile film can be placed over soil in the opposite orientation such that the light absorbing layer, typically a black layer, faces away from the soil relative to the barrier layer. In this orientation, which may desirably be used in winter months or other cool months when cool weather and/or low sunlight prevail, the absorbing layer faces toward the sun and absorbs light and heat to thereby raise the temperature of the underlying soil.

Speaking of the layer to be positioned adjacent the soil as the first skin layer, the layer to be positioned furthest away from the soil as the second skin layer, with at least one barrier layer between them, preferred films include at least one of ACB, ATCB, ACTB, ATCTB, BCA, BTCA, BCTA, BTCTA, BCB, BTCB, BCTB, BTCTB, wherein A is at least one reflective layer, B is at least one UV protecting layer, C is at least one barrier layer and T is at least one tie layer. In each of these films, C optionally and preferably has layers of encapsulating polymer on either side of it, for instance as described in U.S. Pat. No. 6,685,872 or U.S. Pat. No. 4,842,791 which are incorporated herein by reference to the extent permitted by law. Preferred encapsulating polymers include ethylene vinyl acetate, ethylene methacrylate or combinations thereof. Any tie layer is optionally also reflective or UV protective or an AT, TA, BT, TB combination is optionally a single layer having both functions. Further, those skilled in the art will understand that there are optionally additional layers between the listed layers or even outside the skin layer, for instance a clear protective layer, a label layer that could be printed on either side thereof (which optionally can be a clear layer) or combination thereof without departing from the scope of the present invention.

At least one barrier layer, at least two protecting layers and optionally at least one UV protecting layer, at least one white pigmented or reflective layer and/or other layers are formed into a multilayer film by any process within the skill in the art. In one embodiment, the layers are coextruded. In another embodiment, the layers are coextruded and blown or cast. In yet another embodiment, the layers are coextruded and blown to form a film. Such processes are within the skill in the art. Simple blown bubble film processes are described, for example, in The Encyclopedia of Chemical Technology, Kirk-Othmer, Third Edition, John Wiley & Sons, New York, 1981, Vol. 16, pp. 416-417 and Vol. 18, pp. 191-192. A representative multilayer film in accordance with this application can therefore be made by a process of (a) supplying at least one first composition comprising at least one vinylidene chloride polymer, and at least one second composition comprising a first polymer and optionally at least one UV absorbing pigment or agent and/or at least one reflective pigment, and at least one third composition comprising a second polymer and optionally at least one UV absorbing pigment or agent and/or at least one reflective pigment to a coextrusion die and (b) coextruding the first, second and third compositions as layers; preferably expanding the coextruded layers to form a multilayer film. Those skilled in the art recognize that a coextruded film is structurally different from a laminated or bonded multilayer film in that the layers are more integral or uniform or a combination of both in the coextruded film that in the laminated or bonded film which may have irregular layers from melting and attachment or may have additional adhesive layers. The multi-layer film can be rolled as is well known in the art, to put the film in a convenient form to later be unrolled over soil after introduction of a fumigant into the soil.

In one manner of preparing soil to produce a crop, soil is fumigated by injecting a fumigant composition composed of one or more volatile substances into the soil and, thereafter, covering the soil surface with a polymeric film as described herein. In some cases fertilizers or other pesticides can be applied to the bed simultaneously with or after fumigant injection as a separate field operation before the polymeric film is installed. The polymeric film can also be used to cover soil that has been treated with other volatile substances, such as, for example, other volatile pesticides or other organic volatiles. The polymeric film can be placed over a wide variety of different types of soil, including soil in an open field used to grow grains, forage crops, fruits, vegetables, flowers, trees, shrubs and the like, as well as trays of flowers or vegetables grown in greenhouses, and soil used in various other agricultural practices, including raised beds, flat areas and others. The polymeric film, when placed over a soil in which the volatile substance or substances are entrained, reduces loss of volatile substances into the atmosphere. The fumigation method of this application can be effectively used to eradicate weeds, disease and/or parasites from soil used to grow a wide variety of crops and non-crop plant products, including, but not limited to, tomatoes, potatoes, strawberries, cucumbers, melons, trees, shrubs, flowers and turf grasses.

One example of a volatile substance that can be used as a soil fumigant is methyl bromide. Methyl bromide (MB) is a restricted use agricultural pesticide, available for retail sale and use only by certified pesticide applicators or persons under their direct supervision. It is a colorless, tasteless, non-flammable gas which is odorless except at extremely high concentrations. It is currently registered with EPA as an insecticide, fungicide, nematicide, and herbicide for many fruit and vegetable crops, and as a structural and commodity fumigant. Pre-plant application of methyl bromide to soils controls a wide variety of pests at a lower cost than use of many specific pesticides. Moreover, in some instances, pesticides are not available to effectively manage a specific pest problem, e.g., *Fusarium oxysporum*, thus necessitating the use of methyl bromide for economic crop production. For subtropical agricultural production systems, use of methyl bromide is cost effective for many high value crops. It controls a relatively wide spectrum of pests, thus reducing overall use of pesticides required to produce a given crop. For pest control purposes, MB can be mixed in various proportions with Chloropicrin (CP). In low concentrations, CP is used primarily as an odorant for detection of MB which is odorless. At higher concentrations (upwards of 30%), CP is effective as a fungicide.

In one manner of fumigating a selected area of soil, a mixture of methyl bromide and CP is provided, for example, in one or more compressed gas cylinders, and it is shank-injected into the soil 6 to 9 inches deep using a positive pressure closed system. For example, the system can be pressurized with nitrogen gas or other inert gas. Rates of application can vary, for example from about 100 to about 400 lbs or more of the active ingredient per acre. Once injected into soil and at temperatures above 40° F., MB vaporizes rapidly into a gas and diffuses through open soil pore space. Because diffusion is greater in air above the soil surface, upward mass flow and diffusion is usually greater than downward movement and much of the gas escapes the soil and enters the atmosphere unless upward diffusion is restricted. Soil moisture content has a bearing in this regard, primarily as it relates to the availability of continuous pore space. Soils with relatively high moisture content can inhibit extensive diffusion through soil. Soils with relatively low moisture content can promote the rapid escape of gases from soil into the atmosphere. Soil temperature is also a factor as it relates to soil moisture, because it directly influences the vaporization rate of methyl bromide or other volatile substance in soil. As temperatures increase the vaporization rate increases. For example, a recent report suggests that when MB was applied to a dry, sandy soil, under conditions of high air and soil temperatures, and there was a 20 minute delay between fumigation and covering, a 40% loss of MB from the soil was observed. In some applications, soil conditions are selected and/or soil preparations are performed prior to fumigation to enhance soil retention.

The multilayer film placed over soil after introduction of a volatile fumigant operates as a barrier to mass transfer of the volatile substance or substances from the soil to the atmosphere, thus reducing the loss of the volatile fumigant into the atmosphere. As a result, the active volatile substance or substances in the fumigant are kept in contact with the soil, and thus in contact with the soil-borne pests, for a greater length of time. Two significant variables that affect the effectiveness of a fumigation operation are contact time between the fumigant and the soil-borne pests, and concentration of fumigant in the soil. Correspondingly, increasing fumigant retention in the soil over a period of time can increase the efficacy of the fumigant, and/or reduce the amount of fumigant needed per unit area (also referred to herein as the application rate) to achieve a desired result.

Other elements of a fumigation protocol can vary significantly. In alternate manners of fumigating soil, additional features can be included such as, for example, appropriate soil preparation and specifically-designed spraying means. For example, a given protocol can involve prior treatment of the soil according to certain parameters, such as, for example, tilling, smoothing, irrigating or the like. In addition, after a fumigant is injected into the soil using suitable agricultural tools, the soil surface can be rolled and/or compacted. Such treatment steps prior to or after incorporation of the fumigant into the soil are optional activities that may be determined by one of ordinary skill in the art, depending on many factors.

Moreover, a wide variety of fumigants or other volatile substances can be used in connection with the multilayer films described herein, and fumigation protocols utilizing such films can be used in connection with a wide variety of different crops. For example, the compositions, techniques and methods described herein can be used in connection with biopesticides such as those disclosed in U.S. Pat. No. 6,207,705, and synthetic pesticide/fumigants, many of which are known and available commercially. Of particular interest are synthetic fumigants such as, for example and without limitation, the following: methyl bromide, chloropicrin, 1,3-dichloro-1-propene (cis), 1,3-dichloro-1-propene (trans), mixtures of cis and trans 1,3-dichloro-propene, methyl isothiocyanate, metham-sodium, methyl iodide, sulfuryl fluoride, dimethyl disulfide, metam potassium, dazomet, 1,1,1,-trifluoro-2,6-dinitro-N,N-dipropyl-p-toluidine and 2,4-dichlorophenoxyacetic acid. In addition, after fumigation of the soil has been accomplished, planting or sowing of the desired crops can be conducted with or without prior cultivating.

Objects and advantages of this invention are further illustrated by the following examples. The particular materials and amounts thereof, as well as other conditions and details, recited in these examples should not be considered limiting of this invention. Rather they are illustrative of the whole invention. Unless stated otherwise all percentages, parts and ratios are by weight. Examples of the invention are numbered while comparative samples, which are not examples of the invention, are designated alphabetically.

EXAMPLES

Example 1

Laboratory Experiment Comparing Permeability of Several Soil Fumigants Through a Multilayer Film Including a PVDC Barrier Layer and a Multilayer Film Including a Nylon Barrier Layer Experimental Design A layer of a selected film to be tested was clamped between two chambers in a testing device such that the only possible route for a gas to move from one of the two chambers to the other chamber was by diffusion through the film. For these tests, the device was oriented such that the film was positioned on a generally horizontal plane with one chamber above the plane and the other chamber below the plane. The three films tested in this experiment were the following: (i) SARANEX 450™ film commercially available from Dow Chemical Company (Midland, Mich.), which is a multilayer film including a PVDC layer between other film layers, and which has a total film thickness of about 1 mil; (ii) SARANEX 451™ film commercially available from Dow Chemical Company (Midland, Mich.), which is a multilayer film including a PVDC layer between other film layers, and which has a total film thickness of about 1.5 mil; and (3) Blockade™ film commercially available from Pliant Corp. (Schaumburg, Ill.), which is a multilayer film including a nylon layer between other film layers, and which has a total film thickness of about 1.25 mil.

With a given test film positioned in the testing device as described above, a measured amount of the test fumigant was introduced into the lower chamber of the testing device. The test fumigants used in this experiment were methyl bromide, methyl iodide, 1,3-dichloro-1-propene (cis) (hereafter "1,3-D (cis)"), 1,3-dichloro-1-propene (trans) (hereafter "1,3-D (trans)") and chloropicrin. Approximately 15 minutes following introduction of the test fumigant into the lower chamber, the concentration of gas in the upper chamber was measured periodically for up to 693 hours by extracting samples from the upper chamber using a syringe and analyzing the sample using gas chromatography (GC) headspace analysis. From the concentration versus time profile of fumigant in the upper chamber, a mass transfer coefficient was calculated for each film/gas pairing. The mass transfer coefficient "h" represents the amount of a gas, measured as the volume of gas in cubic centimeters ($cm^3$) that moves through a defined area of a film barrier, here a square centimeter ($cm^2$) of film, in a fixed period of time (1 hour). The actual units are $h=cm^3$ gas per $cm^2$ film per hour, which is represented in abbreviated form as h (cm/hr).

Results

The calculated mass transfer coefficients based on the results of this test are set forth in Table 1, below.

TABLE 1

| Film | Mass transfer coefficient | Methyl Bromide | Methyl Iodide | 1,3-D (cis) | 1,3-D (trans) | chloropicrin |
|---|---|---|---|---|---|---|
| 1.5 mil Dow SARAN™ | h (cm/hr) = | 6.3E−05 ± 0.0000 | 3.2E−05 ± 0.0000 | 2.6E−06 ± 0.0000 | 2.6E−05 ± 0.0000 | 1.5E−17 ± 0.0000 |
| 1.0 mil Dow SARAN™ | h (cm/hr) = | 1.7E−04 ± 0.0000 | 1.3E−04 ± 0.0000 | 1.5E−04 ± 0.0000 | 2.9E−04 ± 0.0000 | 4.2E−17 ± 0.0000 |
| Blockade™ Film | h (cm/hr) = | 1.3E−02 ± 0.0006 | 7.7E−03 ± 0.0003 | 9.3E−03 ± 0.0003 | 2.4E−02 ± 0.0023 | 1.1E−04 ± 0.0000 |

The data in Table 1 shows that the 1.5 mil Dow SARAN™ film was about three orders of magnitude more effective (i.e., its mass transfer coefficient h was about three orders of magnitude lower) than the Blockade™ film as a barrier to methyl bromide; about two orders of magnitude more effective than the Blockade™ film as a barrier to methyl iodide; about three orders of magnitude more effective than the Blockade™ film as a barrier to 1,3-D (cis); about three orders of magnitude more effective than the Blockade™ film as a barrier to 1,3-D (trans); and about thirteen orders of magnitude more effective than the Blockade™ film as a barrier to chloropicrin.

The 1.0 mil Dow SARAN™ film also exhibited significantly better barrier function than the Blockade™ film for each of these fumigants. Specifically, the 1.0 mil Dow SARAN™ film was about two orders of magnitude more effective than the Blockade™ film as a barrier to methyl bromide; nearly two orders of magnitude more effective than the Blockade™ film as a barrier to methyl iodide; nearly two orders of magnitude more effective than the Blockade™ film as a barrier to 1,3-D (cis); about two orders of magnitude more effective than the Blockade™ film as a barrier to 1,3-D (trans); and about thirteen orders of magnitude more effective than the Blockade™ film as a barrier to chloropicrin.

These tests therefore established that the PVDC barrier layers of the SARAN™ films exhibited surprisingly better barrier functionality than the nylon barrier layer of Blockade™ film for several common soil fumigants.

Example 2

A Multilayer Film is Formed from the Following Compositions for the Specified Layers Layer A: 15% of film by volume, 76.05% by weight substantially linear polyethylene commercially available from Dow Chemical under the tradename AFFINITY™ PL1881G. This layer also contains 20% by weight of carbon black masterbatch in LLDPE commercially available from Ampacet under the designation 19717. Additionally, it contains 2.4% by weight of UV stabilizer masterbatch commercially available from Ampacet under the designation 100325. It also contains 0.8% by weight of polymer process aid masterbatch in LLDPE commercially available from Ampacet under the designation 10562. In addition, 7500 ppm of diatomaceous silica (Si02) are added.

Layer B: 16% of film by volume, 77.6% by weight substantially linear polyethylene commercially available from Dow Chemical under the tradename AFFINITY™ PL1881G. This layer also contains 20% by weight of carbon black masterbatch in LLDPE commercially available from Ampacet under the designation 19717. Additionally, it contains 2.4% by weight of UV stabilizer masterbatch commercially available from Ampacet under the designation 100325.

Layer C: 16% of film by volume, 97% by weight substantially linear polyethylene commercially available from Dow Chemical under the tradename AFFINITY™ PL1881G. Additionally, it contains 3% by weight of UV stabilizer masterbatch commercially available from Ampacet under the designation 100325.

Layer EN: 10% of film by volume. Outer 2% (4% total) by volume consists of 100% by weight EMA commercially available from Arkema under the tradename LOTRYL™ 24MA02. Inner 8% by volume consists of 100% by weight PVDC commercially available from Dow Chemical under the tradename SARAN™ XUS 32937.00.

Layer D: 12% of film by volume, 97% by weight substantially linear polyethylene commercially available from Dow Chemical under the tradename AFFINITY™ PL1881G. Additionally, it contains 3% by weight of UV stabilizer masterbatch commercially available from Ampacet under the designation 100325.

Layer E: 31% of film by volume, 76.05% by weight substantially linear polyethylene commercially available from Dow Chemical under the tradename AFFINITY™ PL1881G. This layer also contains 20% by weight of carbon black masterbatch in LLDPE commercially available from Ampacet under the designation 19717. Additionally, it contains 2.4% by weight of UV stabilizer masterbatch commercially available from Ampacet under the designation 100325. It also contains 0.8% by weight of polymer process aid masterbatch in LLDPE commercially available from Ampacet under the designation 10562. In addition, 7500 ppm of diatomaceous silica (Si02) are added.

The film of Example 2 is produced on a conventional upward blown film line. This line consists of a 22" (0.56 m) diameter blown film die that is fed by 6 discrete polymer streams. Four of these streams (A, B, D, and E) are supplied by single screw extruders equipped with 75 mm screws. One of the polymer streams (C) is supplied by a single screw extruder equipped with a 100 mm screw. The sixth stream consists of an encapsulated polymer stream (EN) that is generated according to the teachings of U.S. Pat. No. 6,685,872 which is incorporated herein to the extent permitted by law. To generate this encapsulated polymer stream EN, two independent single screw extruders (S, SE) are used to feed an encapsulation die. The output from the encapsulation die is polymer stream EN, which consists of a core stream (S) that is fully encapsulated by another stream (SE).

All of these extruders and screws are commercially available from Davis-Standard. The blown film die and the encapsulation die are both commercially available from Brampton Engineering, under the trade name ISOtherm SCD. The streams enter the blown film die and are "stacked" as follows: A, B, C, EN, D, E. Extruder and die conditions for extruders A, B, C, D, E, S, and SE are listed in Table 2 below.

TABLE 2

Conditions used to generate the film of Example 2

| Element | Value | SI UNIT CONVERSIONS |
|---|---|---|
| Extruder A Temperature Profile (degrees F.): Zone 1/Zone 2/Zone 3/Zone 4/Zone 5/Zone 6/Screen Changer/Transfer Zone 8/Transfer Zone 9 | 300/360/400/400/400/400/400/400/400 | 149/182/204/204/204/204/204/204/204° C. |
| Extruder B Temperature Profile (degrees F.): Zone 1/Zone 2/Zone 3/Zone 4/Zone 5/Zone 6/Screen Changer/Transfer Zone 8/Transfer Zone 9 | 300/360/400/400/400/400/400/400/400 | 149/182/204/204/204/204/204/204/204° C. |
| Extruder C Temperature Profile (degrees F.): Zone 1/Zone 2/Zone 3/Zone 4/Zone 5/Zone 6/Screen Changer/Transfer Zone 8/Transfer Zone 9 | 300/360/400/400/400/400/400/400/400 | 149/182/204/204/204/204/204/204/204° C. |
| Extruder D Temperature Profile (degrees F.): Zone 1/Zone 2/Zone 3/Zone 4/Zone 5/Zone 6/Screen Changer/Transfer Zone 8/Transfer Zone 9 | 300/360/400/400/400/400/400/400/400 | 149/182/204/204/204/204/204/204/204° C. |
| Extruder E Temperature Profile (degrees F.): Zone 1/Zone 2/Zone 3/Zone 4/Zone 5/Zone 6/Screen Changer/Transfer Zone 8/Transfer Zone 9 | 300/360/400/400/400/400/400/400/400 | 149/182/204/204/204/204/204/204/204° C. |
| Extruder S Temperature Profile (degrees F.): Zone 1/Zone 2/Zone 3/Zone 4/Encapsulation Die | 300/310/320/330/320 | 149/154/160/166/160° C. |
| Extruder SE Temperature Profile (degrees F.): Zone 1/Zone 2/Zone 3/Screen Changer/Encapsulation Transfer Line/Encapsulation Elbow/Transfer Line | 280/320/340/350/350/350/320 | 138/160/171/177/177/177/160° C. |
| Die Temperature Profile (degrees F.): Mandrel Bottom/Extruder A/Extruder B/Extruder C/Oil Heated Zone/Extruder D/Extruder E/Outer Lip/Outer Lip Land/Inner Lip Land/Mandrel/Mandrel Extension | 400/400/400/400/330/400/400/380/380/380/380/380 | 204/204/204/204/166/204/204/193/193/193/193/193° C. |
| Extruder A/B/C/D/E/S/SE RPM: | 26/25/12/19/48/20/32 | |
| Extruder A/B/C/D/E/S/SE Head Pressure (psi): | 4160/4668/4001/3997/4650/2700/3897 | 28.7/32.2/27.6/27.6/32.1/18.6/26.9 MPa |
| Extruder A/B/C/D/E/S/SE Output Rate (lb/h): | 126/120/125/96/249/117/16 | 57.2/54.4/56.7/43.5/113/53/7.3 kg/h |
| Extruder A/B/C/D/E/S/SE Load (hP): | 33/38/66/33/46/41/12 | 24.6/28.3/49.2/24.6/34.3/30.6/8.9 kW |
| Layflat (in): | 72 | 1.83 m |
| Line Speed (ft/min): | 184.5 | 0.94 m/s |
| Die Gap (mils): | 45 | 1143 μm |
| Blow up ratio: | 2.1:1 | |
| Film Gauge (mils): | 1.25 | 31.75 μm |

Example 3

Field Experiment Comparing Barrier Functionality of the Multilayer Film Made as Described in Example 2, which Includes a PVDC Barrier Layer, to a Non-PVDC Film The purpose of this experiment was to determine if the half-rate of a pre-plant fumigant used under a multilayer film made as described in Example 2 (referred to herein as "SARAN™ film") provides efficacy against soil pests that is statistically equivalent to the full rate used under a Blockade™ film. The significance of this determination is that, if the efficacy of a fumigant treatment, such as, for example, the standard methyl bromide/chloropicrin (MB/CP) fumigant treatment under SARAN™ when used at 50% of the normal use rate is statistically equivalent to the efficacy of the MB/CP treatment at the full (100%) use rate under Blockade™ film, then the SARAN™ film can enable a significant reduction in the amount of fumigants required to protect crops for pre-plant use.

Experimental Design

Fumigants were introduced into a raised bed using standard soil fumigation equipment and barrier mulches were laid down immediately after fumigation. The fumigants, experimental application rates and films used are identified below:

| | Fumigant | Rate | Film |
|---|---|---|---|
| (i) | MB/CP | 400 lbs pta | Blockade ™ film |
| (ii) | MB/CP | 400 lbs pta | SARAN ™ film |
| (iii) | MB/CP | 200 lbs pta | SARAN ™ film |
| (iv) | Untreated check | | SARAN ™ film |

The experiment included four (4) replications and randomized complete block experimental design. Each of the four replications was a 100-foot length of bed.

Approximately two weeks after fumigation, pepper plants were transplanted into the treated beds.

Nematode data was collected by taking 5 plants from each plot and assessing root damage caused by nematodes at harvest time.

Plant disease data was collected by assessing the number of plants infected by *Phytophthora capsici* at different times after planting. Results from two tests are included.

Efficacy against weeds was collected by counting the number of weeds growing in each plot. Nutsedge data was collected as the number of plants per 30 feet of row. Other weed data was collected as the average number of each weed species growing out of plant holes in each plot.

Results

The results of five specific tests using the above protocol are set forth below.

Tests 1 and 2: Comparison of the efficacy of methyl bromide/chloropicrin (MB/CP) 50:50 combinations under SARAN™ and Blockade™ films against *Phytophthora capsici* in peppers. (Delray Beach, Fla.).

TABLE 3

| Treatment | Rate (lbs pta) | Film | % Control |
|---|---|---|---|
| MB/CP | 400 | Blockade ™ | 87.1ab |
| MB/CP | 400 | SARAN ™ | 96.6a |
| MB/CP | 200 | SARAN ™ | 93.2ab |
| UTC | — | SARAN ™ | 1.7c |

21 DAA Planting
LSD (P=0.10)

TABLE 4

| Treatment | Rate (lbs pta) | Film | % Control |
|---|---|---|---|
| MB/CP | 400 | Blockade ™ | 96.0ab |
| MB/CP | 400 | SARAN ™ | 91.0ab |
| MB/CP | 200 | SARAN ™ | 97.2a |
| UTC | — | SARAN ™ | 5.6c |

14 DAA Planting
LSD (P=0.10)

In Tables 3 and 4, the numbers in the "% Control" column indicate the percent of plants checked following treatment that included no disease symptoms, and numbers identified by like letters are not statistically different.

Of particular note in both of Tables 3 and 4 is that the half-rate of MB/CP (i.e., 200 pounds per treatment acre) under a SARAN™ film provides efficacy against *Phytophthora capsici* infection that is statistically equivalent to the full rate of MB/CP (i.e., 400 pounds per treatment acre) under a Blockade™ film, both at 14 days after planting (Table 4) and at 21 days after planting (Table 5).

Test 3: Comparison of the efficacy of methyl bromide/chloropicrin (MB/CP) 50:50 combinations under SARAN™ and Blockade™ films against weed species in peppers. (Delray Beach, Fla.).

TABLE 5

| Treatment | Rate (lbs pta) | Film | PTLAN | POROL | AMACH |
|---|---|---|---|---|---|
| MB/CP | 400 | Blockade ™ | 100 | 100 | 100 |
| MB/CP | 400 | SARAN ™ | 100 | 100 | 100 |
| MB/CP | 200 | SARAN ™ | 100 | 100 | 100 |
| UTC | — | SARAN ™ | 0 | 0 | 0 |

14 DAA Planting
PTLAN=*Potentilla anserina*=goosegrass
POROL=*Portulaca oleracea*=common purselane
AMACH=*Amaranthus sybridus*=smooth pigweed In Table 5, the numbers in the "PTLAN," "POROL" and "AMACH" columns indicate the percent of weed plants killed by treatment with the identified fumigant and identified film.

Of particular note in Table 5 is that one would expect at least some weeds to survive after application of only the half-rate of MB/CP (i.e., 200 pounds per treatment acre). However, as set forth above, when the half-rate is applied under a SARAN™ film, the fumigant provides efficacy against the three identified weed species that is equally as good as the full rate of MB/CP (i.e., 400 pounds per treatment acre) under a Blockade™ film.

Test 4: Comparison of the efficacy of methyl bromide/chloropicrin (MB/CP) 50:50 combinations under SARAN™ and Blockade™ films against nematodes in squash. (Chula, Ga.).

TABLE 6

| Treatment | Rate (lbs pta) | Film | Damage Rating |
|---|---|---|---|
| MB/CP | 400 | Blockade ™ | 0.15b |
| MB/CP | 400 | SARAN ™ | 0.151b |
| MB/CP | 200 | SARAN ™ | 0.149b |
| UTC | — | SARAN ™ | 1.625ab |

LSD (P=0.050)

In Table 6, the numbers in the "Damage Rating" column indicate the severity of damage cause by nematode feeding. The damage rating is from 1 to 5 with a damage rating of 5 indicating nearly complete damage of the roots. Numbers identified by like letters are not statistically different. As with information in Tables 3-5 above, while one would expect at least some variation in the results after application of only the half-rate of MB/CP (i.e., 200 pounds per treatment acre); as shown in Table 6, when the half-rate is applied under a SARAN™ film, the fumigant provides efficacy against nematodes that is equally as good as the full rate of MB/CP (i.e., 400 pounds per treatment acre) under a Blockade™ film.

Test 5: Comparison of the efficacy of methyl bromide/chloropicrin (MB/CP) 50:50 combinations under SARAN™ and Blockade™ films against yellow nutsedge (CYPES) in squash. (Chula, Ga.).

TABLE 7

| Treatment | Rate (lbs pta) | Film | #/35 feet of row |
|---|---|---|---|
| MB/CP | 400 | Blockade ™ | 54.5a |
| MB/CP | 400 | SARAN ™ | 40.75a |
| MB/CP | 200 | SARAN ™ | 38.25a |
| UTC | — | SARAN ™ | 160b |

LSD (P=0.050)
CYPES=*Cyperus esculentus*=yellow nutsedge

In Table 7, the numbers in the "#/35 feet of row" column indicate the average number of nutsedge plants actually counted in a 35 foot segment of a treated row. The numbers in this column that are identified by like letters are not statistically different. As with information in Tables 3-6 above, while one would expect at least some variation in the results after application of only the half-rate of MB/CP (i.e., 200 pounds per treatment acre); as shown in Table 7, when the half-rate is applied under a SARAN™ film, the fumigant provides efficacy against nutsedge that is equally as good as the full rate of MB/CP (i.e., 400 pounds per treatment acre) under a Blockade™ film.

In all of Tests 1-5 described above, treatment with a half-rate of MB/CP was determined to have equivalent effect to the standard treatment with twice as much MB/CP under a Blockade™ barrier film. The significance of this determination is that, because efficacy of the standard methyl bromide/chloropicrin (MB/CP) fumigant treatment under SARAN™ when used at 50% of the normal use rate is equally as good as the efficacy of the MB/CP treatment at the full (100%) use rate under Blockade™ film, then the SARAN™ film enables a significant reduction in the use of this fumigant for weed control use, thereby reducing the environmental impact of a fumigation treatment, and reducing the size of the government-imposed buffer zone around a treatment area, without reducing the desired weed prevention effect. Blockade™ film has been shown previously to reduce use rates of methyl bromide/chloropicrin (MB/CP) mixed fumigants by as much as 50% over the LDPE film which was the historic standard in the fumigation field. Test results reported above surprisingly show that use rates of MB/PC can be reduced further under SARAN™ film compared to Blockade™ film. In particular, these data show that a 50% reduction of MB/CP application provides equivalent efficacy.

Embodiments of the present invention include:

1. A method for fumigating soil that comprises: (i) introducing a fumigant including at least one volatile substance into or onto soil; and (ii) covering the soil with a multilayer polymeric film to at least partially contain the fumigant; wherein the film comprises a PVDC barrier layer, a first protecting layer on a first side of the PVDC barrier layer and a second protecting layer on a second side of the PVDC barrier layer; and wherein the barrier layer comprises less than about 10% of the thickness of the multilayer polymeric film.

2. A field management method for growing cash crops that are susceptible to interference by one or more of weeds, disease or parasites that comprises: (i) preparing a planting bed of soil for growing a crop; (ii) performing soil fumigation by introducing a volatile fumigant into the planting bed of soil, covering at least a portion of the planting bed of soil with a multilayer polymeric film, and waiting for a period of time, prior to planting or transplanting a cash crop, to kill or suppress growth of one or more of weeds, diseases or parasites by soil fumigation; and (iii) planting or transplanting the cash crop after the period of time ends; wherein the multilayer film comprises a PVDC barrier layer, a first protecting layer on a first side of the PVDC barrier layer and a second protecting layer on a second side of the PVDC barrier layer, wherein the barrier layer comprises less than about 10% of the thickness of the multilayer polymeric film.

3. A method for maintaining volatile agricultural fumigants in intimate contact with soil that comprises (i) treating soil with an effective amount of a fumigant; (ii) covering the fumigant-treated soil with a multilayer film comprising a PVDC barrier layer, a first protecting layer on a first side of the PVDC barrier layer and a second protecting layer on a second side of the PVDC barrier layer, wherein the barrier layer comprises less than about 10% of the thickness of the multilayer polymeric film; and (iii) permitting the fumigant to diffuse through the covered soil.

4. The method of any other embodiment wherein the fumigant is injected into the soil before the soil is covered by the film.

5. The method of any other embodiment wherein the fumigant includes one or more of the following volatile substances: methyl bromide, chloropicrin, 1,3-dichloro-1-propene (cis), 1,3-dichloro-1-propene (trans), methyl isothiocyanate, metham-sodium, methyl iodide, sulfuryl fluoride, dimethyl dibromide, metam potassium, dazomet, 1,1,1,-trifluoro-2,6-dinitro-N,N-dipropyl-p-toluidine and 2,4-dichlorophenoxyacetic acid.

6. The method of any other embodiment wherein the fumigant includes methyl bromide, and the methyl bromide is introduced into or onto the soil at a rate of at most about 300 pounds per treated acre or a rate of at most about 200 pounds per treated acre.

7. The method of any other embodiment wherein the fumigant includes chloropicrin, and wherein the chloropicrin is introduced into or onto the soil at a rate of at most about 300 pounds per treated acre or a rate of at most about 200 pounds per treated acre.

8. The method of any other embodiment wherein the fumigant includes methyl bromide and chloropicrin; and wherein the fumigant is introduced into or onto the soil at a rate of at most about 300 pounds per treated acre or a rate of at most about 200 pounds per treated acre.

9. The method of any other embodiment that further comprises using the soil to grow one or more of the following: tomato plants, pepper plants, strawberry plants, plants of the cucumber family, such as cucumbers and melons, trees, shrubs, flowers and turf grasses.

10. A multilayer film comprising at least one barrier layer comprising at least one vinylidene chloride polymer and at least two protecting layers.

11. The method or multilayer film of any other embodiment wherein the vinylidene chloride polymer is at least one alkyl acrylate vinylidene chloride interpolymer.

12. The method or multilayer film of any other embodiment wherein the acrylate is selected from methyl acrylate, ethyl acrylate, propyl acrylate or butyl acrylate or a combination thereof.

13. The method or multilayer film of any other embodiment wherein the acrylate is selected from methyl or butyl acrylate or a combination thereof.

14. The method or multilayer film of any other embodiment wherein the acrylate is methyl acrylate.

15. The method or multilayer film of any other embodiment wherein the barrier layer or layers comprise at least about any of 80, 85, 90, or 95 percent by weight of polyvinylidene chloride polymer.

16. The method or multilayer film of any other embodiment wherein the barrier layer is preferably at least about any of 5, 6, 7, and independently at most about any of 10, 9, or 8 percent by volume of the multilayer film.

17. The method or multilayer film of any other embodiment wherein the total film thickness is at least about any of 0.5 mils (12.7 µm), 0.75 mils (19.05 µm), or 1.0 mils (25.4 µm), and independently at most about any of 2.0 mils (50.8 µm), 1.75 mils (44.5 µm), or 1.5 mils (38.1 µm).

18. The method or multilayer film of any other embodiment wherein there is additionally at least one UV protecting layer in the multilayer film.

19. The method or multilayer film of any other embodiment wherein at least one of the protecting layers in the multilayer film is a UV protecting layer.

20. The method or multilayer film of any other embodiment wherein both of the protecting layers in the multilayer film are UV protecting layers.

21. The method or multilayer film of any other embodiment wherein the UV protecting layer comprises at least one layer comprising at least one dark pigment, that is a pigment capable of absorbing ultra violet (UV) light, or other UV absorbent or blocker or combination thereof.

22. The method or multilayer film of any other embodiment wherein the pigment or UV absorbent or blocker is selected from, carbon black, HALS (hindered amine light stabilizers), benzophenones and combinations thereof.

23. The method or multilayer film of any other embodiment wherein the UV protecting layer is preferably pigmented with a dark pigment.

24. The method or multilayer film of any other embodiment wherein the dark pigment or UV absorbent or combination thereof are present in an amount sufficient to result in a L* (transmittance) value at most about any of 2, 1.5 or 1.0.

25. The method or multilayer film of any other embodiment wherein the UV absorbent comprises carbon black and is present at a concentration of at most about any of 6, 4, 2 percent by weight carbon black in polymer.

26. The method or multilayer film of any other embodiment wherein the UV protecting layer or combination thereof make up about 50 percent of the volume of the multilayer film.

27. The method or multilayer film of any other embodiment wherein the UV protecting layer comprises a polymer selected from low density polyethylene, ethylene-octene copolymers, ethylene-vinyl acetate copolymers, ethylene methyl acrylate copolymers or combinations thereof, preferably comprising ethylene polymers or combinations thereof.

28. The method or multilayer film of any other embodiment wherein more than one UV protecting layer is present.

29. The method or multilayer film of any other embodiment wherein the combined thickness of the UV protecting layer or layers in the multilayer film is at least about any of 0.5 mil (7.6 μm), 0.75 mil (12.7 μm), 1.0 mil (17.8 μm), and independently preferably at most about any of 2.0 mil (38.1 μm), 1.75 mil (53.0 μm), or 1.0 mil (27.9 μm).

30. The method or multilayer film of any other embodiment wherein the combined thickness (volume) of the UV protecting layer or layers in the multilayer film at least about any of 25, 50, 75, and independently at most about any of 100, 95, 90 volume percent of the film.

31. The method or multilayer film of any other embodiment wherein there is additionally at least one reflective layer in the multilayer film.

32. The method or multilayer film of any other embodiment wherein at least one of the protecting layers in the multilayer film is a reflective layer.

33. The method or multilayer film of any other embodiment wherein both of the protecting layers in the multilayer film are reflective layers.

34. The method or multilayer film of any other embodiment wherein each reflective layer independently comprises at least one of white pigment, silver, aluminum, or other metallic pigment or has a reflective coating or a combination thereof.

35. The method or multilayer film of any other embodiment wherein the white pigment comprises titanium dioxide or combinations therewith.

36. The method or multilayer film of any other embodiment wherein the reflective layer is preferably sufficiently reflective to accomplish those of the following purposes appropriate for a preselected end use: protection from light, protection from heat, aesthetic appeal, printability, or a combination thereof.

37. The method or multilayer film of any other embodiment wherein the reflective layer comprises an amount of reflective or white pigment sufficient to result in a L* (reflectance) value as determined by the procedures of ASTM E308-06 of preferably at least about any of 75, 80, or 85.

38. The method or multilayer film of any other embodiment wherein the reflective or white pigment is present in an amount of at least about any of 2, 4, or 6 and independently at most about any of 20, 15, or 10 weight percent of each reflective layer.

39. The method or multilayer film of any other embodiment wherein there is more than one reflective layer.

40. The method or multilayer film of any other embodiment wherein the combined thickness of the reflective layer or layers is at least about any of 0.25 mils (6.4 μm), 0.5 mils (12.7 μm), or 0.75 mils (19.1 μm), and independently at most about any of 1.25 mils (31.8 μm), 1.0 mils (25.4 μm), or 0.75 mils (19.05 μm).

41. The method or multilayer film of any other embodiment wherein the combined thickness (volume) of the reflective layer or layers comprises at least about any of 17, 33, or 50, and independently at most about any of 83, 75, 67 volume percent of the film.

42. The method or multilayer film of any other embodiment wherein the reflective layer or layers (including any coating or coatings thereon) also reflects at least about 95 percent of UV light that reaches the film and is, therefore also a UV protecting layer.

43. The method or multilayer film of any other embodiment wherein the reflective layer comprises at least one polymer selected from linear low density polyethylene (LLDPE), ethylene-octene copolymers, substantially linear ethylene polymers, low density polyethylene, nylon, polypropylene or combinations thereof, preferably comprising at least one ethylene polymers or combinations thereof, more preferably at least one LLDPE or combination thereof, most preferably with at least one other ethylene polymer.

44. The method or multilayer film of any other embodiment wherein the multilayer film also comprises at least one tie layer.

45. The method or multilayer film of any other embodiment wherein at least one reflective layer is also a tie layer.

46. The method or multilayer film of any other embodiment wherein at least one tie layer is also a reflective or UV protective layer or a combination thereof.

47. The method or multilayer film of any other embodiment wherein at least one reflective layer comprises ethylene vinyl acetate (EVA) or substantially linear ethylene polymers or a combination thereof, more preferably EVA or a combination therewith.

48. The method or multilayer film of any other embodiment wherein the multilayer film comprises layers represented by ACB, BCB, ATCB, ACTB, ATCTB, BTCB, BCTB, BTCTB or a combination thereof in the indicated sequence wherein A is at least one reflective layer, B is at least one UV protecting layer, C is at least one barrier layer, and T is at least one tie layer and in each instance C optionally has encapsulating layers on either side of it. In addition, in any of these embodiments, A can optionally be adequately reflective to also be UV protective.

49. The method or multilayer film of any other embodiment wherein at least one barrier layer has encapsulating polymer on either side of it.

50. The method or multilayer film of any other embodiment wherein the encapsulating polymer comprises at least one of ethylene vinyl acetate, ethylene methacrylate or combinations thereof.

What is claimed is:

1. A method for fumigating soil, comprising:
   introducing a fumigant into or onto soil; and
   covering the soil with a multilayer polymeric film to at least partially contain the fumigant;
   wherein the film comprises a PVDC barrier layer, a first protecting layer on a first side of the PVDC barrier layer and a second protecting layer on a second side of the PVDC barrier layer;
   wherein the PVDC barrier layer comprises at least one alkyl acrylate vinylidene chloride interpolymer; and
   wherein the barrier layer comprises less than about 10% of the thickness of the multilayer polymeric film.

2. The method of claim 1 wherein the fumigant includes at least one member selected from the group consisting of methyl bromide, chloropicrin, 1,3-dichloro-1-propene (cis), 1,3-dichloro-1-propene (trans), methyl isothiocyanate, metham-sodium, methyl iodide, sulfuryl fluoride, dimethyl dibromide, dimethyl disulfide, metam potassium, dazomet, 1,1,1,-trifluoro-2,6-dinitro-N,N-dipropyl-p-toluidine, 2,4-dichlorophenoxyacetic acid and mixtures thereof.

3. The method of claim 1 wherein the fumigant includes at least one member selected from the group consisting of methyl bromide, chloropicrin, 1,3-dichloro-1-propene, methyl isothiocyanate, methyl iodide, sulfuryl fluoride, dimethyl disulfide and mixtures thereof.

4. The method of claim 1 wherein the acrylate is selected from the group consisting of methyl acrylate, ethyl acrylate, propyl acrylate, butyl acrylate and combinations thereof.

5. The method of claim 1 wherein the barrier layer comprises at least one vinylidene chloride/methyl acrylate; and each of the first and second protecting layers comprises a polymer selected from the group consisting of a low density polyethylene, an ethylene octene polymer, an ethylene vinyl acetate, a substantially linear ethylene polymer, an ethylene methyl acrylate and combinations thereof.

6. The method of claim 1 wherein at least one of the protecting layers is a UV protecting layer that further comprises at least one carbon black, hindered amine light stabilizer, benzophenone or combination thereof.

7. The method of claim 6 wherein the UV protecting layer has a L* (transmittance) value at most about 2.

8. The method of claim 6 wherein the UV protecting layer comprises a polymer selected from the group consisting of a low density polyethylene, an ethylene-octene copolymer, an ethylene-vinyl acetate copolymer, an ethylene methyl acrylate copolymer and combinations thereof.

9. The method of claim 1 wherein at least one of the protecting layers is a reflective layer that further comprises titanium dioxide, a metallic pigment or combination thereof.

10. The method of claim 9 wherein the reflective layer has a L* (reflectance) value as determined by the procedures of ASTM E308-06 of at least about 75.

11. The method of claim 9 wherein the reflective layer comprises a polymer selected from the group consisting of a linear low density polyethylene (LLDPE), an ethylene-octene copolymer, a substantially linear ethylene polymer, a low density polyethylene, a nylon, a polypropylene and combinations thereof.

12. The method of claim 1, wherein the film further comprises at least one tie layer comprising ethylene vinyl acetate.

13. The method of claim 1, wherein the film further comprises at least one encapsulating layer comprising a member selected from the group consisting of ethylene vinyl acetate, ethylene methacrylate and combinations thereof.

14. The method of claim 1 wherein the barrier layer has encapsulating layers on either side of it.

15. The method of claim 14 wherein said encapsulating layers comprise at least one member selected from the group consisting of ethylene vinyl acetate, ethylene methacrylate and combinations thereof.

16. The method of claim 1 wherein the total film thickness is at most about 1.5 mils (38.1 um).

17. The method of claim 1 wherein the barrier layer is at least about 5 percent by volume of the multilayer film.

18. The method of claim 1 wherein the barrier layer is at most about 10 percent by volume of the multilayer film.

19. The method of claim 1 wherein the barrier layer comprises at least about 5 and at most about 10 volume percent of the film, the first protecting layer comprises at least about 10 and at most about 60 volume percent of the film, and the second protecting layer comprises at least about 10 and at most about 60 volume percent of the film.

20. The method of claim 1 wherein the multilayer film comprises layers represented by ACB, BCB, ATCB, ACTB, ATCTB, BTCB, BCTB, BTCTB or a combination thereof in the indicated sequence wherein A is at least one reflective layer, B is at least one UV protecting layer, C is at least one barrier layer, and T is at least one tie layer.

21. The method of claim 1 wherein the fumigant comprises sulfuryl fluoride.

22. The method of claim 1, wherein the PVDC barrier layer further comprises an ethylene methyl acrylate copolymer.

23. The method of claim 22, wherein the ethylene methyl acrylate copolymer includes 50 or more percent by weight of ethylene derived units and 50 or less percent by weight of methyl acrylate derived units.

24. A field management method for growing cash crops that are susceptible to interference by one or more of weeds, insects, diseases, nematodes or other parasites, comprising:
   preparing a planting bed of soil for growing a crop;
   performing soil fumigation by introducing a fumigant into the planting bed of soil, covering at least a portion of the planting bed of soil with a multilayer polymeric film, and waiting for a period of time, prior to planting or transplanting a cash crop, to kill or suppress growth of one or more of weeds, insects, diseases, nematodes or other parasites by soil fumigation; and
   planting or transplanting the cash crop after the period of time ends;
   wherein the multilayer film comprises a PVDC barrier layer, a first protecting layer on a first side of the PVDC barrier layer and a second protecting layer on a second side of the PVDC barrier layer, wherein the barrier layer comprises at least one alkyl acrylate vinylidene chloride interpolymer and wherein the barrier layer comprises less than about 10% of the thickness of the multilayer polymeric film.

25. A method for maintaining at least one agricultural fumigant in contact with soil, comprising treating soil with an effective amount of a fumigant; covering the fumigant-treated soil with a multilayer film comprising a PVDC barrier layer, a first protecting layer on a first side of the PVDC barrier layer and a second protecting layer on a second side of the PVDC barrier layer, wherein the barrier layer comprises at least one alkyl acrylate vinylidene chloride interpolymer and wherein the barrier layer comprises less than about 10% of the thickness of the multilayer polymeric film; and permitting the fumigant to diffuse through the covered soil.

* * * * *